United States Patent

[11] 3,591,215

| [72] | Inventors | Richard H. Frost;<br>John Maguire; Jonathan E. Sharp, all of Littleton, Colo. |
|---|---|---|
| [21] | Appl. No. | 847,884 |
| [22] | Filed | Aug. 6, 1969 |
| [45] | Patented | July 6, 1971 |
| [73] | Assignee | Rose Manufacturing Company<br>Kansas City, Mo. |

[54] PLASTIC ROPE CONNECTOR
6 Claims, 11 Drawing Figs.

[52] U.S. Cl. .................................... 287/77, 264/251
[51] Int. Cl. .................................... F16b 7/04
[50] Field of Search .......................... 287/49, 50, 51, 63, 64, 75, 77; 24/123; 264/251, 263

[56] References Cited
UNITED STATES PATENTS

| 1,642,484 | 9/1927 | Burgett | 287/49 X |
| 2,920,354 | 1/1960 | Zumbrunnen | 264/251 X |
| 3,447,277 | 6/1969 | Korf | 287/49 X |

FOREIGN PATENTS

| 229,040 | 2/1925 | Great Britain | 287/51 |

Primary Examiner—David J. Williamowsky
Assistant Examiner—Wayne L. Shedd
Attorney—Van Valkenburgh and Lowe ABSTRACT: This invention concerns a plastic, buttonlike connector for securing a pair of crossed ropes together and also, a method and mold for forming the connector upon a pair of crossed ropes by injection molding operations. The method of injection molding of a plastic connector about a pair of crossed ropes involves steps of holding the rope in position within a mold cavity while a plastic is being injected into the mold cavity. The construction of the mold cavity includes features to so restrain the ropes and also includes passageways to permit a pair of ropes to extend from the cavity, but with the passageways being closed by the ropes to prevent loss of plastic during the injection operation.

INVENTORS
Jonathan E. Sharp
Richard H. Frost
John Maguire

BY
ATTORNEYS

INVENTORS
Jonathan E. Sharp
Richard H. Frost
John Maguire

BY
ATTORNEYS

PLASTIC ROPE CONNECTOR

This invention relates to rope connectors and more particularly to connectors for securing crossed ropes. As such, the invention, an improved rope connector and hereinafter referred to as a rope connector or simply a connector, is useful in the manufacture of rope nets, rope ladders and the like.

There is a continual increasing demand for comparatively heavy rope nets, that is, for nets manufactured with ⅜ and ½-inch size ropes or larger, for safety nets for hauling cargo and for similar purposes. There is also a need to reduce the cost for these comparatively large rope nets. Initially, such nets have been manufactured by hand weaving, with heavy and cumbersome shuttles. It is simply not practical to weave a net with such large ropes, either manually or by machine. Accordingly, it has been proposed to manufacture rope nets by interlocking crossed ropes, spaced apart in an arrangement similar to a warp and a woof of a weave. Various clips and clamps prepared ahead of time have been proposed for this purpose, but have not proven to be especially successful. There is a need for an improved rope connector for the manufacture of rope nets which has a high holding strength, which is economical and which is easy to apply to crossed ropes.

The present invention was conceived and developed with the foregoing considerations in view, and comprises, in essence, a connector of a selected thermoplastic, synthetic resin formed by injection molding about a pair of crossed ropes. Preferably, the form of the connector is such as to attain a maximum degree of strength with the minimum amount of material.

An object of the invention is to provide a novel and improved rope connector of a selected thermoplastic synthetic resin for interconnecting crossed ropes, which has substantial strength and toughness, which grips the ropes tightly and which is especially suited for the manufacture of rope nets.

Another object of the invention is to provide a novel and improved rope connector which can be quickly and easily applied to crossed ropes to simplify the manufacture of heavy rope nets.

Another object of the invention is to provide a novel and improved rope connector which may be effectively used with various types of ropes, and manufactured from a variety of easily obtainable materials, as a low-cost, neat-appearing, compact, rugged and durable unit.

Another object of the invention is to provide a unique and simplified method for the injection molding of a connector about a pair of crossed ropes which insures the gripping and holding of the crossed ropes in position during the injection operation to properly fit the connector upon the ropes, in a symmetrical, uniform manner.

Other objects of the invention are to provide a novel and improved mold form for the injection molding of a thermoplastic resin connector about a pair of crossed ropes which permits the ropes to be quickly and easily aligned within the mold, which thereafter holds the ropes in position against the forces encountered during injection of hot plastic resin into the mold, and which provides for a subsequent, quick cooling of the resin to prevent possible damage to the rope by the hot resin.

With the foregoing and other objects in view, the present invention comprises certain constructions, combinations and arrangements of parts and elements and selected operations, sequences and steps as hereinafter described, defined in the appended claims and illustrated in the accompanying drawing in which:

Figure 4:
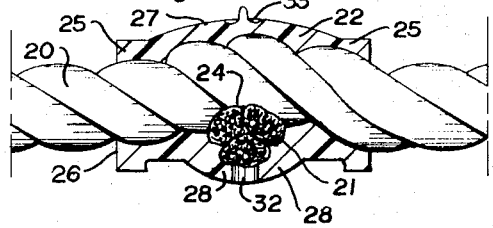
FIG. 4 is a sectional elevation view through the connector as taken from the indicated line 4—4 at FIG. 2.
Figure 5:
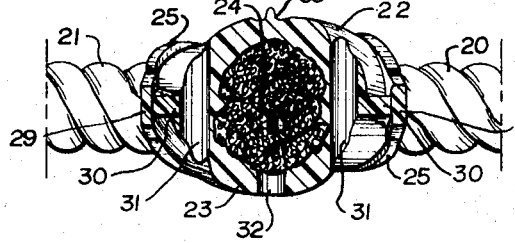
FIG. 5 is a sectional auxiliary view through the connector as taken from the indicated line 5—5 at FIG. 2.
Figure 6:
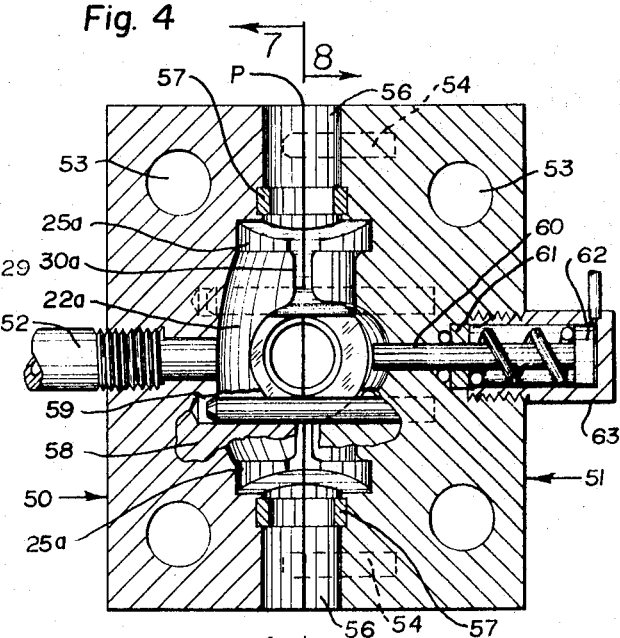

FIG. 6 is a sectional elevation view of a two-piece mold for the manufacture of the connector by injection molding, with the mold blocks being closed together, the sectional view being taken through a central transverse plane of the mold which is at the same location as the section shown at FIG. 4, but with some portions of the mold being shown in broken lines and with portions being broken away to show constructions otherwise hidden from view.

Figure 7:
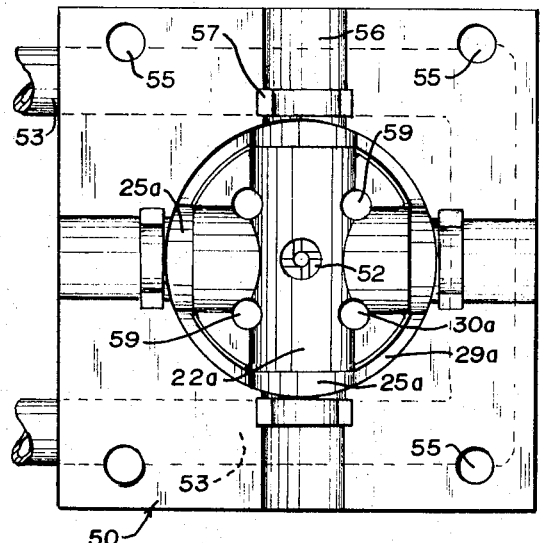

FIG. 7 is a plan view of one face of the mold as taken from the parting line of the mold in the direction of the indicated arrows 7—7 at FIG. 6.

Figure 8:
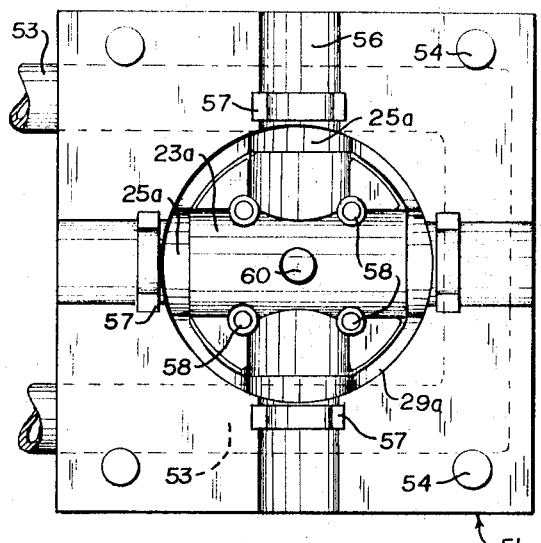

FIG. 8 is a plan view of the opposite face of the mold as taken from the parting line of the mold in the direction of the indicated arrows 8—8 at FIG. 6.

Figure 2:
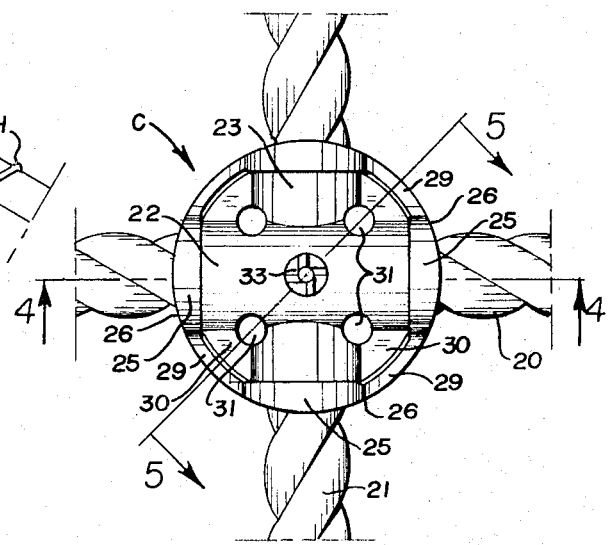
FIG. 2 is a plan view of a preferred embodiment of an improved connector formed about a pair of crossed ropes.
Figure 3:
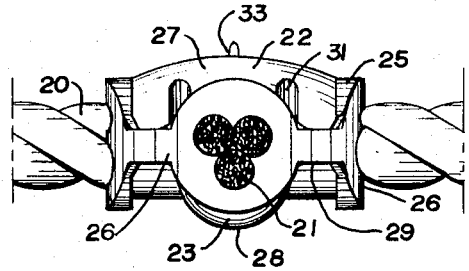
FIG. 3 is a side elevation view of the connector and ropes shown at FIG. 2.
Figure 9:
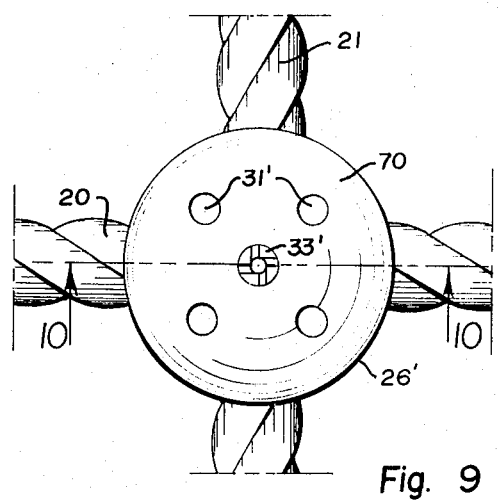

FIG. 9 is a plan view of a connector similar to FIG. 2, but showing an alternate embodiment incorporating the principles of the invention.

Figure 10:
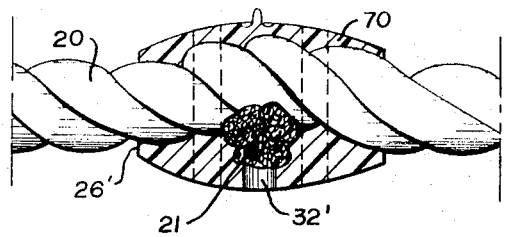

FIG. 10 is a sectional elevation view through the connector illustrated at FIG. 9, as taken from the indicated line 10—10 at FIG. 9.

Figure 11:
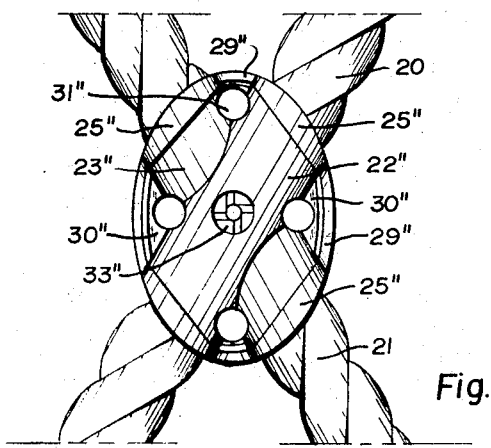

FIG. 11 is a plan view of a connector similar to FIG. 2, but showing another alternate embodiment of the invention wherein the ropes are crossed at an inclination as to provide for a diamond-shaped net arrangement.

The present invention concerns the joining of two crossed ropes by a connector of thermoplastic resin which is formed about the ropes by an injection molding operation. The invention permits rope nets to be manufactured in a simple manner, and is especially useful for the manufacture of comparatively heavy rope nets, formed by ⅜-inch, ½-inch and even larger ropes.

Figure 1:
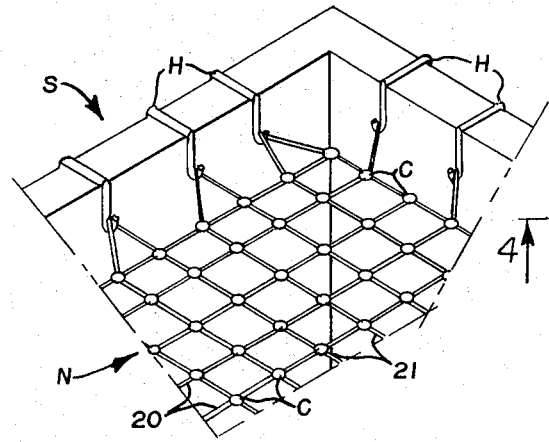
FIG. 1 is a fragmentary perspective view of a net spanning an opening to illustrate one manner in which a net manufactured in accordance with the invention may be used.

To exemplify the use of such a net, FIG. 1 illustrates, somewhat diagrammatically, a portion of the entrance of a vertical shaft S, having a safety net N secured thereover, as by anchor hooks H holding the edges of the net about the sides of the shaft. The net, when used to prevent a person from falling into the shaft, is made of at least ⅜-inch rope with the mesh spacing being 6-inches or less.

Consonant with the present invention, the net N is manufactured by crossing spaced longitudinal ropes 20 and spaced transverse ropes 21, so designated as a matter of convenience, and with the ropes at each crossing being secured together by connectors C having the general form of a button as illustrated at FIG. 2.

The connector C is preferably formed of one of several types of thermoplastic, synthetic resins, hereinafter called "Plastics," which are capable of being melted and molded to shape under the influence of heat and pressure. For example, suitable thermoplastic plastics having various melting points include: polystyrene m.p. 250—400° F.; polyethylene m.p. 300—450° F.; polypropylene m.p. 340—450° F.; nylon m.p. 440—600° F. Also such plastics can be blended with various fillers and reinforcing materials such as fiberglass, to improve the resistance to ultraviolet light and to increase the strength of the material. Another group of plastics which may also be used for the manufacture of a connector include thermosetting types of plastics, for example, various types of polyester and polysulfide epoxy compounds.

One preferred plastic is polyethylene because it can be melted at a comparatively low temperature, has excellent molding qualities, and is very tough and somewhat elastic, being able to withstand considerable abuse, such as the stretching and pulling of the ropes without tearing or breaking. Moreover, polyethylene can be specified as a high density, medium density or low density material to obtain selected variations in its physical properties, a high density or medium density polyethylene being preferable for rope connectors disclosed herein.

The connector C is capable of being used with several different types of rope, such as ropes of manila, cotton and various types of plastics such as rayon, polypropylene and drawn nylon. However, in connection with the plastic ropes, it is to be noted that the connector is formed by a hot, melted plastic flowing about the rope in a mold and it may become important to select a connector material which will not melt or otherwise damage the strands of the ropes. On the other hand, the opposite result may be desired, that is to provide sufficient heat as to essentially weld the connector to the rope. Simple tests can determine whether or not a plastic of a selected type, suitable in other respects, can be used with a given rope.

The preferred type of connector C, illustrated at FIGS. 2 to 5, is in the form of a circular button holding a pair of crossed ropes 20 and 21, having a diameter, preferably between three and four times the rope size, a maximum thickness of about twice the rope size and being generally symmetrical about a polar axis, normal to the plane of the ropes. As a matter of convenience, the following description will refer to the face of the connector shown at FIG. 2 as being the upper face, although it is recognized that in use, the connector may be oriented in any desired manner.

This connector is formed as a pair of tubular, crossed sheaths tightly embracing the ropes, an upper sheath 22 holding the longitudinal rope 20 and a lower sheath 23 holding the transverse rope 21. These sheaths merge at the center of the connector with the crossed ropes within them being tightly squeezed together as at 24, FIG. 4, to minimize the thickness of the connector.

Each outward end of each sheath, 22 and 23, terminates as a circular flange 25 having its outer wall 26 arcuate to form a portion of the circular, peripheral edge of the connector. These flanges are oriented to be centered at a common level, at a central plane through the connector normal to the polar axis thereof, with the ropes extending from each flange at a centered position so that the axes of all rope portions extending from the connector lie in the common central plane. Accordingly, the portion of each rope 20 and 21 within the connector, is arched as an offset to accommodate the other rope at the common crossing point, at the center of the connector, as in the manner illustrated at FIG. 4. At the same time, the outward edge of each sheath 22 and 23 is arched, as at 27 and 28 respectively, to permit each sheath to better embrace the portions of the ropes 20 and 21 within the connector.

The crossed flanged sheaths 22 and 23, in the shape of a cruciform, are further reinforced and rigidified by arcuate rims 29 between the adjacent edges of adjacent flanges 25 to complete the circular, outer wall of the connector as illustrated. The pielike spaces between the crotches of the crossed sheaths and these arcuate rims are enclosed by comparatively thin fillets 30, at the central plane of the connector, to provide a continuity of structure.

This connector C includes four passageways 31, one at each crotch of the cruciform shaped sheaths and these passageways are formed by retaining pins, hereinafter described. The connector also includes a shallow base socket 32 in the lower sheath 23 at the axis of the connector. To complete the unit thus described, a rosette mark 33 will appear at the top of the upper sheath 22, opposite the socket 32, which is a disruption resulting from the action of an injection nozzle at the wall of the mold wherein the connector is formed.

FIGS. 6—8 illustrate a mold M for forming the connector C upon a pair of crossed ropes. Injection molding apparatus capable of retaining the mold M to move the mold section together and apart is conventional and need not be described. In the manufacture of a rope net, it is contemplated that the longitudinal and transverse ropes will be properly spaced apart on a suitable frame, and that the frame and the injection apparatus will be shiftable with respect to each other with suitable indexing controls to position the mold at each rope crossing point to form a connector, all in any suitable sequence of shifting operations.

The mold M is formed as two half sections: a feed section 50 and a backing section 51, so designated because of the location of an injection nozzle 52 in the feed section which enters the mold cavity at its center to form the rosette 33 heretofore described. This rosette is formed because a crosslike configuration of the nozzle exit is provided in lieu of a simple orifice to prevent a rope strand from accidentally blocking off the flow of plastic into the mold. These sections are separable at a suitable parting plane P, preferably at a central plane of the connector and move together and apart by conventional means, not shown. Also, other features of these mold sections are conventional. For example, each section may include cooling passageways 53 to carry a coolant liquid to reduce the setting time of a hot plastic material injected into the mold cavity. The backing section may include suitable guide pins 54 on the face plane of that section and the feed section may include mating sockets 55 on its face plane to assure proper registration of the mold sections when they come together.

The mold cavity is in the general form of the connector, having an upper sheath portion 22a, a lower sheath portion 23a, flange portions 25a, arcuate rim portions 29a and spaces 30a to form the fillets 30. A skilled die maker can form these features of the mold cavity, and will preferably form the cavity portions in each section 50 and 51 in a balanced manner with the parting plane P at the center plane of the connector as illustrated.

A unique feature in high pressure injection molding resides in the passing of crossed ropes through the mold in order to inject the connector about them. Accordingly, passageways 56 extend from the mold cavity to each side of the mold, with each mold section 50 and 51 forming a half of the passageway. To prevent leakage of plastic from the mold cavity through these passageways, a gate ring 57 is located in each passageway adjacent to each flange portion 25a of the mold cavity which is sized to squeeze the rope extending through the passageway with sufficient tightness as to prevent flow therepast, but not so tight as to cut or otherwise damage the rope. Each gate ring 57 is formed as two half-ring portions with a ring portion being at each mold section 50 and 51.

To hold the crossed ropes 20 and 21 across the mold cavity and in position within the mold while the hot, viscous plastic is being injected into the mold cavity, four fingerlike restraining pins 58 are mounted upon the backing section 51 to extend across the cavity parallel with the polar axis thereof. These restraining pins hold the crossed ropes at each crotch of the cross and prevent sidewise movement of the ropes. When the sections 50 and 51 are closed together, the pins 58 extend into sockets 59 in the feed section 50 of the mold. Accordingly, they form the passageways 31 through the connector C as heretofore described. As such, they may be tapered slightly to facilitate removing the connector from the mold after it is formed.

The force of viscous plastic injected from the nozzle 52 is substantial and is sufficient to push the ropes against the opposite wall of the mold cavity in the backing section 51. Accordingly, a spacer pin 60 is provided at the center of the mold cavity opposite the nozzle 52 which protrudes a short distance into the sheath portion 23a of the mold cavity to contact and abut against the transverse rope section 21 when it is placed into the mold cavity. This forms the socket 32 in the finished connector.

The spacer pin 60 is also used to remove a finished connector from the mold after it has been formed upon a pair of crossed ropes and cooled and after the mold cavities 50 and 51 move apart. This pin 60 is ideally suited for an ejector since it is at the polar axis of the connector. To perform this ejection function, the connector pin is extended through an axially centered passageway 61 in the backing section 51 to function as a piston rod and terminate as a piston 62 in a hydraulic cylinder 63 carried upon the backing section 51. The piston 62 actuates within the cylinder 63 to extend the spacer pin 60 outwardly and across the mold cavity as a single complete ejection movement, the length of the pin being sufficient to push the finished connector off the retaining pins 58 so that it may be easily removed from the mold. Suitable hydraulic lines extend from a regulator pressure source to the cylinder in any manner to extend and retract this spacer pin 60, the lines not being shown in the drawing because the same may be an entirely conventional, well known arrangement for extending and retracting a rod such as the spacer pin 60. It is apparent that the pin may also be arranged to eject with a suitable mechanical linkage instead of the hydraulic mechanism shown.

In operating the mold to manufacture a connector C upon a pair of crossed ropes, the mold sections 50 and 51 are initially separated and the crossed ropes 20 and 21 are located between the mold sections with the transverse rope 21 being at the side of the backing section 51. First, the transverse rope 21 is placed in position against the backing section 51, with the rope lying in the proper passageways 56 and placed between the two sets of pins 58. Next, the longitudinal rope section 20 is placed in position against the backing section of the mold 51 and in its passageways and between the two sets of pins 58 crosswise from the rope 21. Next, the mold cavity is closed and injection of hot fluid plastic commences. Restrained, as above described by the pins 58 and the spacer pin 60, the plastic flows evenly about the ropes to form the connector.

After the connector is completed and cooled, the mold sections move apart. The connector is secured to the restraining pins 58 and thus remains with the backing section 51. Extension of the spacer pin 60 moves the connector off the pins, and the apparatus is ready for another cycle of operation.

FIGS. 9 and 10 illustrate a connector of a more simplified form, that is, in the general form of a flat, oblate spheroid 70. The longitudinal and transverse ropes 20 and 21 extend through the spheroid 70 as heretofore described.

Although the sheath forms about the ropes are eliminated by using the bulky spheroid shape, it is still necessary to retain the ropes in position and accordingly, the passageways 31' and the socket 32' at the pole of the spheroid, will be formed in the modified connector, using a mold similar to that heretofore described, the spheroid being bounded by a circular wall 26' from whence the rope portions extend. Also, the rosette 33' will appear on the pole opposite the socket 32'.

FIG. 11 illustrates a connector which is modified by inclining the ropes at an angle to provide for a diamond-shaped net or the like. This unit provides for an elliptically shaped connector with the wall 26" being rounded to an elliptical form, but is otherwise substantially the same as the connector shown at FIG. 2, having an upper sheath 22" and lower sheath 23" terminated by flanges 25". The flanges are connected by arcuate rims 29" with the gaps closed by fillets 30" as aforedescribed. The structure includes passageways 31", a socket 32" which is not shown, and a rosette mark 33" on the upper face of the unit.

We have now described our invention in considerable detail and the same is further defined in the appended claims.

We claim:

1. A rope connector for connecting a pair of crossed ropes, comprising:
   a. a generally tubular sheath embracing each rope, with the ropes lying against each other and with center portions of the sheaths merging together at the center of the connector to form a crosslike unit; and
   b. a reinforcement segment between each of the adjacent arm portions of the crossed sheaths, with such segments being disposed with respect to each other, to form a peripheral wall about the connector which merges into each sheath, with the ropes extending from this wall at the merged sheath ends.

2. In the connector defined in claim 1, wherein said sheaths and the ropes within them are opposingly offset within the reach of the sheaths to place the axis of each rope portion extending from the connector in a common plane, normal to the polar axis of the unit.

3. In the connector defined in claim 1, wherein the same is formed of a plastic having the general properties of polyethylene.

4. In the connector defined in claim 1 wherein said reinforcement segments are arcuate and form a ringlike flange merged with the ends of the sheath.

5. In the connector defined in claim 4, including fillets in the spaces between the crossing sheaths and the flange ring.

6. A rope connector for connecting a pair of crossed ropes formed of a synthetic resin plastic molded about the crossed ropes, and comprising:
   a. A generally tubular sheath embracing each rope, with the ropes lying against each other and with the sheaths merging together at the center of the connector into a crosslike unit; and
   b. A peripheral wall forming a ringlike flange about the connector merging into each end of each sheath, said rope portions extending from the surface of this wall.